Nov. 24, 1925.

H. D. JAMIESON

MILKING MACHINE

Filed May 23, 1923   3 Sheets-Sheet 1

1,562,770

Inventor:
H. D. Jamieson

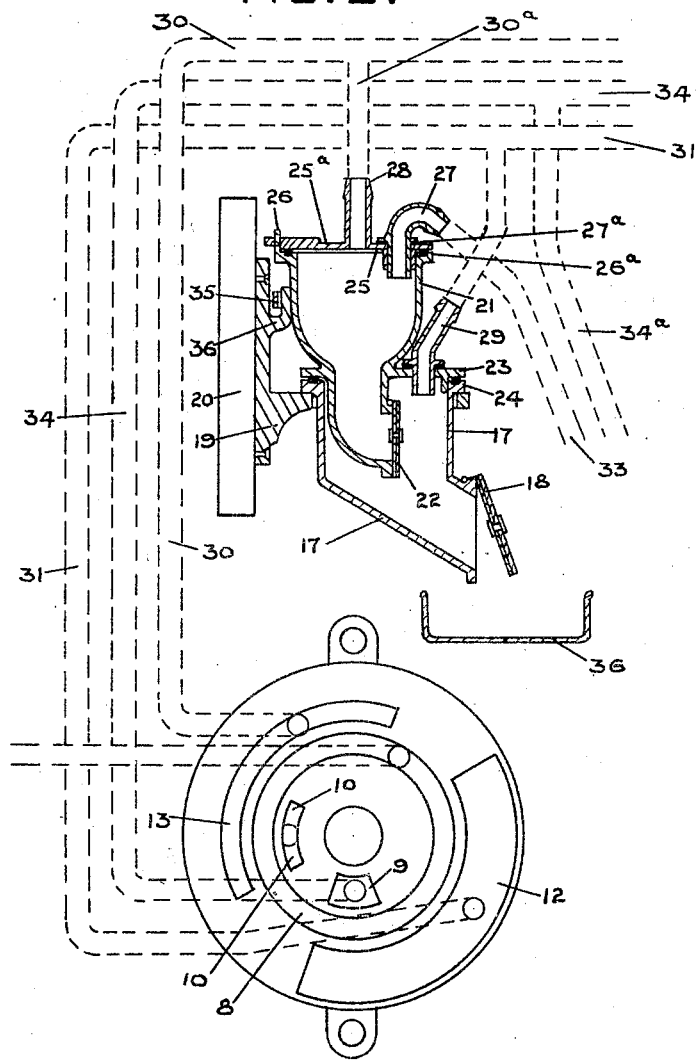

Nov. 24, 1925.  
H. D. JAMIESON  
MILKING MACHINE  
Filed May 23, 1923   3 Sheets-Sheet 3

1,562,770

Inventor  
H. D. Jamieson

Patented Nov. 24, 1925.

1,562,770

UNITED STATES PATENT OFFICE.

HERBERT DRUMMOND JAMIESON, OF KEREPEHI, NEW ZEALAND.

MILKING MACHINE.

Application filed May 23, 1923. Serial No. 640,969.

*To all whom it may concern:*

Be it known that I, HERBERT DRUMMOND JAMIESON, a subject of the King of Great Britain, residing at Kerepehi, in the Provincial District of Auckland, in the Dominion of New Zealand, have invented new and useful Improvements in Milking Machines, of which the following is a specification.

This invention relates to milking machines and particularly to the class of machine having a pulsator working in combination with a milk releaser of the two chambered type.

The object of my invention is to make a pulsator and milk releaser which will deliver both the milk and the froth from the milk into the catch vessel and be capable of using the plant for any number of cows or for testing one individual cow, giving in addition ready facility for assembling and disassembling the various parts for washing out and cleaning.

The chief disadvantage with the existing types of milking machines is the fact that they allow a certain amount of froth from the milk to find its way from the releaser into the main vacuum pipe and main vacuum pipe tank. The method of releasing and pulsating in my invention so as to prevent froth from the milk getting into the main vacuum pipe and tank is accomplished by maintaining a constant vacuum in the upper chamber of the releaser by alternate routes, the pulsator effecting direct connection of the air exhausting means with the top chamber of the releaser and alternately by shutting off the connection for vacuum to the top chamber of the releaser, and taking the vacuum through the bottom chamber of the releaser so as to bring down the froth with the milk from the top chamber to the lower chamber and then expel the same to a suitable catch vessel as hereinbefore described.

The milk releaser can otherwise be designed much on the existing methods as adopted for two chambered releasers wherein a flap valve delivers the milk from the upper chamber to the lower chamber and another flap valve delivers the milk from the lower chamber to the catch vessel, except that the connections to the two chambers are altered so as to provide for maintaining vacuum in the top chamber by alternate routes, and also that means are provided for swivelling the lower chamber of the releaser around to any angle relative to the upper chamber which is fastened to a bracket by any convenient means. Swivelling of the lower chamber allows of the milk being delivered into a long conduit or it can be turned away from the conduit so as to deliver the milk into a separate vessel when used for checking individual cows.

The mechanism to effect the pulsating so as to operate the milk releaser by the method revealed in my invention may be varied somewhat as regards port arrangements so long as the pulsator will give an alternate vacuum and atmospheric connection to the lower chamber of the releaser, and constant vacuum to the upper chamber, this however, being by alternate routes as described.

In the accompanying drawings illustrating my invention and to which I hereinafter refer, Figures 1, 2, 3 and 4 show an arrangement of pulsator and milk releaser whereby the pulsating is effected by means of a rotary disc and in which the speed of pulsating is the same in both teat cups and lower chamber of releaser.

Figure 5 illustrates a method of connecting the rotary disc and pulsating when the pulsations are required in the teat cups at a faster rate than in the lower chamber of the releaser.

Figure 1:
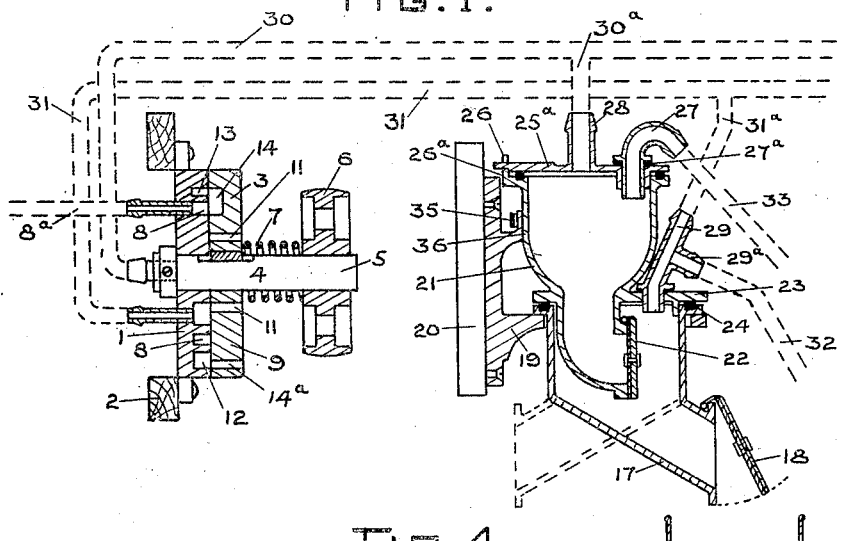
Figure 4:
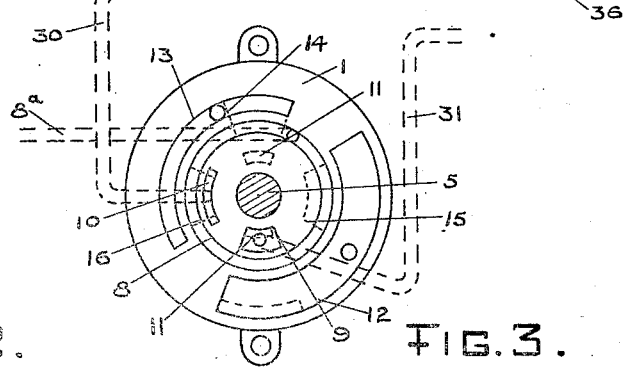
Figure 2:
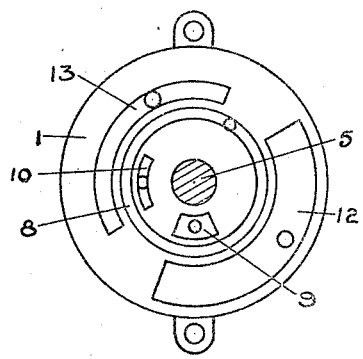
Figure 3:
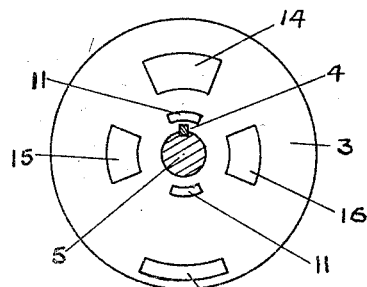

The pulsator (Figures 1 to 4) comprises a stationary plate or disc 1 adapted to be secured to a wall, post or other support 2 and a disc 3 mounted on a feather key 4 on the shaft 5 which projects from the plate or disc 1. A pulley 6 keyed on the shaft 5 enables the latter and the disc 3 to be driven, the spring 7 surrounding the shaft 5 between the pulley 6 and disc 3 keeping the latter against the plate or disc 1.

In the face of the plate 1 against which the disc 3 works, is formed a circular groove 8 which is connected with air exhausting means by a pipe 8ᴬ and is constantly under vacuum.

Also in the inner face of the plate or disc 1 are radial recesses 9 and 10 the former having a greater width than the latter, the greatest radius of which is however equal to or the same as the greatest radius of the recess 9.

The reason the recess 9 is made wider than the recess 10 is to enable it to be opened to atmosphere by each of the air ports 11 (in turn) in the rotary disc 3, during the latter's rotation, said ports 11 each missing the recess 10 to which it is not desired to admit air.

Also in the inner face of the plate 1 are opposite outer radial recesses 12 and 13, the former being wider than the latter, while the smallest radius of each is the same, the reason being so that while the air port 14$^A$ in the disc 3 can admit air to the recess 12, it will not admit air to the narrow recess 13, to which it is not desired air should be admitted.

In the inner or working face of the rotary disc 3 recesses 14, 15 and 16 are formed, the former being provided for the purpose of connecting the circular vacuum groove 8 with the outer radial recesses 12 and 13, while the recesses 15 and 16 each in turn connect the groove 8 with the inner radial recesses 9 and 10.

The releaser (Figures 1 and 5) is of the two chamber type, and comprises a lower portion 17 tapering to an outlet controlled by a flap valve 18, and supported in a bracket 19 secured to a wall, post or the like 20. The upper portion 21 of the releaser also tapers to an outlet, the latter being controlled by a flap valve 22 above which is a flanged plate 23 which fits on and forms a top to the portion 17, a rubber ring 24 placed between said plate 23 and the portion 17 ensuring an air tight joint being made when the interior of the portion 17 is under vacuum. The outlet from the upper portion 21 and the valve 22 project into the lower portion 17.

A flanged top 25 is provided to the upper portion 21, with a slightly projecting bar 25$^A$ on top, said bar being slipped under a lug 26 attached to the top edge of the portion 21, the object being to keep the top 25 in position when the milk pipe is hanging on to same and vacuum has not been applied to the releasers. As the top chamber 21 is always under vacuum, a rubber ring 26$^A$ is inserted between the portion 21 and top 25, the latter being prevented from moving when vacuum is applied.

A nipple 27 with a circular rubber seat 27$^A$ is slipped through a hole in the top 25, vacuum inside the chamber 21 ensuring a perfect air tight joint.

This nipple 27 is connected with the milk spaces of teat cups and provides for the passage of milk from the teats to the upper chamber of the releaser.

A nipple 28 also in the top 25 is adapted to be connected with a pipe from the pulsator as will be hereinafter described, while a nipple 29 with a rubber seating similar to the nipple 27 in the plate 23 is adapted to be also connected with the pulsator, and in some cases is also provided with a branch 29$^A$ for connection with the annular spaces of teat cups.

The connecting up and operation of the pulsator and the releaser when it is not required that the teat cups should pulsate faster than the releaser will now be described (see Figure 1).

From the recess 10 a pipe 30 runs through the shed as far as required, and is connected through branches 30$^A$ with the nipple 28 of the upper chamber of each releaser used.

From the recess 9 a pipe 31 runs through the shed the necessary distance in order that branches 31$^A$ can be connected to the nipples 29 opening into the lower chamber of the releasers. Each branch nipple 29$^A$ is connected by a pipe 32 with the annular spaces of a set of teat cups, while each nipple 27 is connected by a pipe 33 with the milk spaces of a set of teat cups.

The recesses 12 and 13 in this case are not required and ports opening into same are plugged up, nor do the recess 14 and port 14$^A$ in the disc 3 take any part in the operation described. The circular groove 8 as before stated is under constant vacuum, and as the disc 3 turns against the plate 1, the recesses 15 and 16 which are always open to the ring 8, each once in every revolution of the disc connects first the recess 9 with the ring 8 and then the recess 10 with the latter. The air ports 11 in the disc 3 are placed between the recesses 15 and 16 the result of which is that following the exhaustion of air from the lower chambers of the releaser and the annular spaces of the teat cups through the pipes 31, 31$^A$ and 32 air is admitted to the recess 9 to cause the pulsations necessary to bring about the collapse of the rubber linings of the teat cups around the teats, and also to break down the vacuum in the lower chambers of the releasers, whereupon milk flows from the latter.

Owing to there being two air ports 11 and two recesses 15 and 16 two pulsations are created during each revolution of the disc 3. It will also be observed that the positions of the recesses 9 and 10 are such that both cannot be under vacuum at the same time, and that while air is being admitted to the lower chambers of the releasers and to the annular spaces of the teat cups, air is being exhausted from the upper chambers of the releasers and from the inner or milk spaces of the teat cups, and also that when air is being exhausted from the lower chambers of the releasers and from the annular spaces of the teat cups the upper chambers of releasers and milk spaces to teat cups are in direct communication through the valve 22 (being open) along pipe 31 to constant vacuum, or in other words the means of exhaustion to the upper chamber are through alternate routes first through nipple 28 then through nipple 29.

When it is required that the pulsations should occur in the teat cups at a faster rate than in the lower chamber of the releaser, the connections to the pulsator and releaser would be made as shown in Figure 5. In this case, the pipe 30 which leads to the upper chamber of the releaser is connected to the recess 13 while the port opening into the recess 10 is plugged up. The pipe 31 providing communication between the pulsator and the lower chambers of the releasers in this case leads from the recess 12, while the connections 34ᴬ to the annular spaces of the teat cups are made from a third pipe 34 from the recess 9 and running the necessary distance through the shed. The pipe 33 to the milk spaces of the cups is from the nipple 27 as before.

The recesses 15 and 16 and ports 11 in the disc 3 act as before and cause two pulsations to be created in the annular spaces of the teat cups, during each revolution of the disc 3, while the recess 14 connects the recesses 12 and 13 alternately with the circular vacuum groove 8 or once each during each revolution of the disc 3, while the port 14ᵃ opens the recess 12 to atmosphere once during each revolution of the disc 3 and during the time the recess 13 is under vacuum per recess 14.

It will therefore be seen in the case of pulsating the teat cups and releasing milk from the releasers at the same rate, that by the arrangement of ports and recesses in the two discs and the connecting ports, pipes and nipples from the releasers and teat cups thereto that the upper chambers of releasers and the milk spaces of the teat cups are always under vacuum, first by means of port 10 and the pipes and nipples connected thereto, and then when exhaustion is cut off at port 10 it is instantaneously applied to the bottom chambers of releasers and the annular spaces of the teat cups, up through and past the open valve 22 into the top chambers of releasers as well as to the milk spaces of teat cups. Vacuum is therefore always maintained in the upper chambers of releasers and the milk spaces in teat cups. While atmosphere is freely admitted (without restraint or regulation) alternately with the exhaustion of air from the bottom chambers of releasers and the annular spaces of the teat cups, pulsations to the latter and the releasing of milk from the bottom chambers of releasers occur alternately.

In the event of it being necessary to pulsate the teat cups at twice the rate of releasing milk from the bottom chambers of releasers, air is exhausted alternately from the upper chambers of releasers and to the milk spaces of teat cups by means of the ports and recesses 12 and 13 in conjunction with recess 14 and the pipes and nipples connected thereto.

While air is being exhausted from the said upper chambers of releasers and the milk spaces to the teat cups, free atmosphere is being admitted to the lower chambers only per ports 12 and pipe 31 in conjunction with the atmospheric port 14ᴬ on the rotary disc, thus the release of milk from the bottom chambers of the releasers in this case takes place once only for every complete revolution of the rotary disc. The annular spaces of the teat cups are in this case connected with exhaustion and the inlet of free atmosphere by means of recess and port 9 only in the stationary plate or disc (port 10 being plugged up).

The movement of recesses 15 and 16 and air ports 11 passing over port 9 twice in one revolution of the rotary disc thus cause the annular spaces of the teat cups to be pulsated twice to one release of milk from the bottom chambers of releaser.

Figure 6:
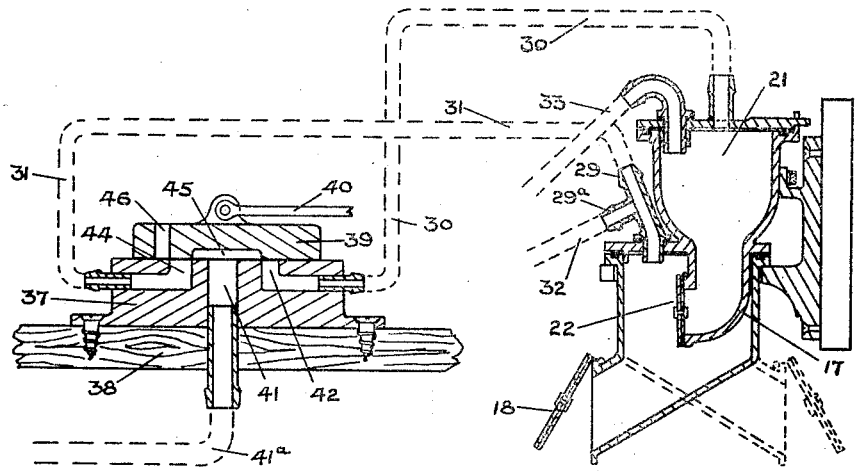
Figures 6, 7 and 8 show an alternative method of effecting pulsating by means of slide valve instead of rotary discs.
Figure 7:
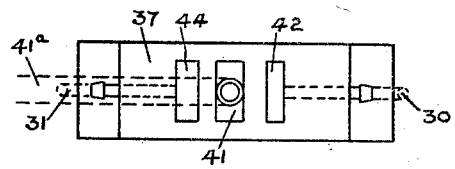
Figure 8:
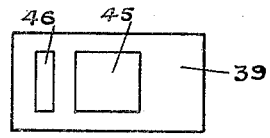

Figures 6, 7 and 8 illustrate a method by which existing slide valve plants, which are used for pulsating could be utilized so as to perform the pulsating and the releasing of milk from the two chambered releaser by the methods hereinbefore described, that is the exhaustion of air from the upper chamber of releaser and milk spaces of the teat cups continuously, but through alternate routes.

Where entirely new plants are installed with my invention, for pulsating milk through the two chambered type of releaser, I prefer the installation of the rotary disc method of pulsation as shown in Figures 1, 2, 3, 4 and 5, but where existing plants have the pulsation effected by a slide valve it may be cheaper to utilize the existing slide valve pulsator and alter the slide valve, ports and connections thereto so as to perform the releasing of milk by the method hereinbefore described.

Many of the existing slide valve pulsators are made after the manner as shown on the accompanying drawing, and although the particular arrangement of making the ports and valves may vary somewhat, the pipe connections, ports and valve to the pulsator can usually be altered so as to perform the releasing of milk and pulsating of teat cups according to my invention by connections to the top and lower chambers respectively.

In Figure 6 the reference figures to the releaser and pipes and connections thereto are the same as those on Figures 1, 2, 3, 4 and 5. In this case the body of the pulsator 37 is secured to a suitable support 38 on which the slide valve 39 operated by eccentric rod 40 reciprocates.

In the case of the slide valve fixture, I form a port 41 which is connected with air exhausting means by the pipe 41^A and is constantly under vacuum. Also in the face of the pulsator 1, I form a port 42 which is connected to the intermittent vacuum pipe 30 leading to the top chamber 21 of the releaser. I also form a port 44 equal in width to port 42 and spaced equidistant on the opposite side of port 41 and which is connected by pipe 31 with nipple 29 to the lower chamber of the releaser.

In the face of the D slide valve 3, I form a recess or port 45, the length of which as shown on drawing is equal to the width of port 41 and port 44 and the bar of metal 9^A intervening between. Also in the D slide valve 3, I form port 46 connecting to atmosphere.

The arrangement as drawn in Figure 6 pulsates the teat cups and releases milk at the same speed which is usually about 40 pulsations per minute, the same as shown in Figures 1, 2, 3 and 4.

Should it be required to release milk from the releaser at a slower speed than the pulsating of the teat cups, I would fit in a separate valve to work the pulsation of the teat cups at the usual speed about 40 per minute. The operation of pulsating as shown in Figure 6 is as follows:

When port 42 is opened to the constant vacuum pipe 41^a by the D valve 39 moving to the right, vacuum is formed in the top chamber 21 of the releaser per medium of pipe 30 whilst at the same time atmosphere enters the bottom chamber 17 per medium of ports 46 and 44 and pipe 31, and also to pulsate the teat cups per pipe 32 as shown, and during this stroke of the valve milk is released from the bottom chamber through valve 18. On the return stroke of the valve 39 immediately the top chamber 21 is cut off to vacuum per medium of port 42 and pipe 30, atmosphere is shut off the bottom chamber by the port 46 cutting off port 44 as shown on drawing Figure 6, with the valve in mid position.

Therefore, immediately vacuum is shut off from the top chamber 21 by pipe 30 being closed, it is opened to vacuum per medium of ports 44 and 45 and pipe 31 and valve 22, that is to say vacuum is maintained in the upper chamber 21 of the releaser by alternate routes as hereinbefore described by means of the rotary disc pulsator.

So long as valve 39 uncovers port 44 to vacuum, valve 18 in releaser is closed and the most important function of my invention is performed, namely, bringing down the froth from the milk which has accumulated in chamber 21 through valve 22 into chamber 17, vacuum during this stroke of the valve being admitted to the pulsation pipe 32 leading to the teat cups.

Mechanically other alternatives, such as double ported valves, etc., as regards port arrangements in valve 39 and pulsator 37 might be substituted to effect the object of my invention, namely, to positively bring down the froth from the milk from chamber 21 to chamber 17, and which is effected by maintaining vacuum in chamber 21 by alternate routes as shown.

I am therefore only claiming the slide valve form of pulsation having ports disposed therein so as to maintain constant vacuum in the top chamber of the releaser by alternate routes, in combination with the releaser as hereinbefore described.

It is therefore obvious that by altering the ports in either rotary disc, plug cock or slide valve type of pulsator the ratios of speed of pulsation between the teat cups and releasers could be varied.

The lower portion 17 of the releasers is turnable on its mounting for the purpose of enabling milk to be delivered either into an open gutter or milk conductor 36 or an open bucket, the object being so that a means of checking and weighing the milk from any cow with a view to testing the same can be done at any time, without the aid of any additional plant.

The upper chambers of releasers have means whereby all pipes and nipples necessary for the release of milk connect thereto, and the said chambers are held in their seat on the top of the bottom chambers by means of a bracket 19 attached to the wall 20, a holed or slotted projection 35 on the side of the said upper chambers fitting on a vertical pin 36 on said bracket. No movements of the upper chambers 21 can therefore take place to interfere with the pipes or nipples when the bottom chambers 17 are being turned round. The two nipples 27 and 29 are fitted with rubber ring joints in such a way that vacuum from within makes an air tight joint, and when necessary to dismantle releasers for cleaning purposes, these joints are easily disconnected.

By the designs and method adopted in such releasers the whole can be taken down and apart for the purpose of cleaning with the greatest of ease and in a very few seconds, and on account of the methods adopted in positively emptying the upper and lower chambers alternately, no accumulation of milk or froth can take place in the upper or lower chambers of releasers. Therefore comparatively small chambered releasers can be used.

Figure 9:
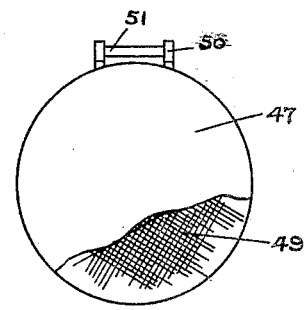
Figures 9 and 10 show an improved method of making the flap valves for the releaser.
Figure 10:
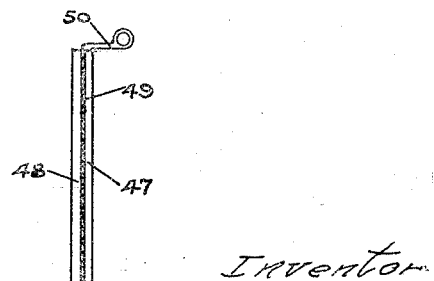

Figure 9 illustrates my improved form of flap valve for use in the releaser. The improvement in this case consists in vulcanizing the rubber face 47 on the inner face of the valve and a rubber face 48 on the outer face of the valve, an intermediate disc 49 of punched metal plate or gauze being interposed to allow of the two faces being vulcanized together. The central plate of gauze 49 terminates in two lugs or projections 50 through which is secured hinge pin 51. This type of valve usually has the seating against which it bears slightly inclined so that the valve closes on its seat by gravity.

This type of valve prevents corrosion of metal parts of the valve which come in contact with the milk, and is much more sanitary to clean than a metal faced valve.

In existing practice an air tight joint is secured between the metal faced valve and the metal faced seat by interposing a rubber ring which usually fits into a sunk groove either on the seat or on the face of the valve.

By the method hereinbefore described, a milking machine having the system of releasing effected according to my invention positively prevents froth or milk from the releaser passing through the various pipe connections into the air exhausting means, whether pulsating be effected by rotary disc, slide valves or other method, and also allows the plant to be readily assembled and disassembled for cleaning the various parts.

I claim:—

1. In a milking machine, a milk releaser including upper and lower chambers, a connection to establish communication between the upper chamber and a pulsator whereby to produce an intermittent vacuum in said chamber, a milk pipe connection from the teat cups to said upper chamber, means to establish communication between the lower chamber and an alternate vacuum and atmospheric connection of a pulsator and the annular spaces of the teat cups, so that air is exhausted from the upper chamber of the releaser and from the milk spaces of the teat cups continuously but by alternate routes whereby when vacuum is by the lower chamber, the froth as well as the milk itself is brought down into the lower chamber substantially as described and illustrated.

2. In a milking machine a releaser as claimed in claim 1, characterized in that while vacuum is on the top chamber through the intermittent vacuum connection, atmosphere is opened to the lower chamber and to the annular spaces of the teat cups so as to expel the milk and froth from the lower chamber and pulsate the teat cups substantially as described and illustrated.

3. In a milking machine, a releaser as claimed in claim 1 characterized by the provision of means for fastening the upper chamber of the releaser to a suitable bracket and means for swivelling the lower chamber to any position so as to deliver the milk to a conduit or to a separate vessel for checking purposes substantially as described and illustrated.

4. In a milking machine a pulsator of the rotary disc type wherein the ports, recesses and grooves in the stationary and rotary disc or plates are so arranged as to give an intermittent vacuum to the pipe connecting with the top chamber of a releaser having upper and lower chambers, and to give alternate vacuum and atmosphere to the connection fixed to the lower chamber of the releaser so as to maintain constant vacuum in the top chamber of the releaser but by alternate routes and to release milk at the same rate as the pulsations of the teat cups substantially as described.

5. A milking machine provided with air exhausting means connected with a double chambered milk releaser as claimed in claim 1 in combination with a pulsator of the slide valve type, the ports in the pulsator body and the slide valve being so arranged as to give intermittent vacuum at one end connecting with the top chamber of the releaser and to give alternate vacuum and atmosphere at the other end of the pulsator so as to connect with the lower chamber of the releaser to effect the working of the releaser by maintaining constant vacuum in the top chamber by alternate routes and expelling the milk and froth from the lower chamber as hereinbefore specified and described.

6. A milking machine provided with air exhausting means connected with double chambered milk releaser and teat cups containing rubber inflations, and pulsator of a suitable type, and means coacting with the exhausting means, releaser and pulsator whereby to maintain constant vacuum in the upper chamber of the releaser and the milk spaces of the teat cups by alternate routes and to make and break vacuum in the lower chamber of releaser and pulsate the annular spaces of the teat cups substantially as described illustrated.

In testimony that I claim the foregoing as my own, I have hereto affixed my signature.

HERBERT DRUMMOND JAMIESON.